Figure 1:
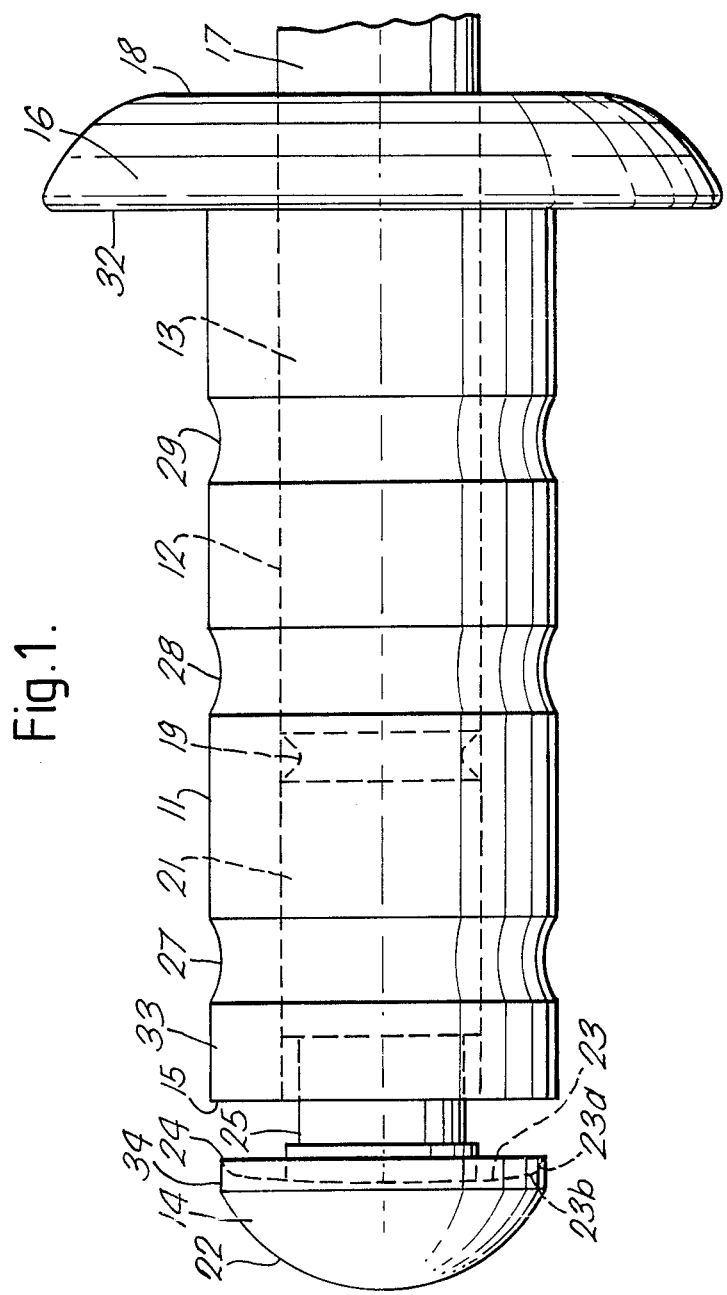

United States Patent [19]

Lacey et al.

[11] Patent Number: 4,958,971
[45] Date of Patent: Sep. 25, 1990

[54] BREAK-STEM BLIND RIVET

[75] Inventors: Raymond D. Lacey, Essendon; William D. Bradley, Welwyn Garden City, both of England

[73] Assignee: Avdel Limited, Hertfordshire, England

[21] Appl. No.: 407,707

[22] Filed: Sep. 14, 1989

Related U.S. Application Data

[63] Continuation of Ser. No. 147,907, Jan. 25, 1988, abandoned.

[30] Foreign Application Priority Data

Jan. 30, 1987 [GB] United Kingdom ............... 8702155

[51] Int. Cl.$^5$ ........................................... F16B 13/04
[52] U.S. Cl. .......................................... 411/38; 411/43; 411/69
[58] Field of Search .............................. 411/34-38, 411/39-43, 69, 501

[56] References Cited

U.S. PATENT DOCUMENTS

| | | | |
|---|---|---|---|
| 2,030,166 | 2/1936 | Huck | 411/34 X |
| 2,324,142 | 7/1943 | Eklund | 411/38 X |
| 3,136,203 | 6/1964 | Davis | 411/38 |
| 3,438,301 | 4/1969 | Mattioli | 411/34 |

FOREIGN PATENT DOCUMENTS

| | | | |
|---|---|---|---|
| 7912 | 6/1933 | Australia | 411/34 |
| 0168355 | 1/1986 | European Pat. Off. | 411/43 |
| 8525482 | 11/1985 | Fed. Rep. of Germany . | |
| 2625023 | 12/1976 | France | 411/34 |
| 640451 | 7/1950 | United Kingdom . | |

*Primary Examiner*—Neill R. Wilson
*Attorney, Agent, or Firm*—Oblon, Spivak, McClelland, Maier & Neustadt

[57] ABSTRACT

A breakstem blind rivet comprises a deformable tubular shell 11 of aluminium alloy having a bore 12 inside it. A stem 13 of low-carbon steel is a close fit within the bore, extending along the bore and having a head 14 adjacent the tail end 15 of the shell. The outside of the shell is formed with at least three zones 27, 28, 29 of modified strength spaced apart along its length, these zones being in the form of shallow grooves rolled into the surface. The spacing between each zone 27, 28, 29 and the next progressively decreases as the distance along the shell from the tail end 15 increases. Alternatively the grooves may be formed by a turning process.

10 Claims, 2 Drawing Sheets

BREAK-STEM BLIND RIVET

This application is a continuation of application Ser. No. 147,907, filed on Jan. 25, 1988, now abandoned.

The invention relates to a break-stem blind rivet, and more particularly to a break-stem blind rivet comprising a deformable tubular shell having a bore inside it and a stem along the bore and having a head adjacent one end of the shell. The exterior of the shell is formed with a plurality of circumferential grooves or other zones of modified strength spaced apart along the shell. When axial compression is applied to the shell by pulling on the stem, these zones of modified strength promote buckling and outward deformation of the shell to form a blind head. By "blind" rivet is meant one which can be installed by access to one side only of the workpiece, and by "blind" head is meant a head which is formed on the blind or inaccessible side of the workpiece.

One feature of such rivets which is important to the user is that a stock of identical rivets can be used to secure together different combinations of workpieces having a total thickness which can vary over as wide a range as possible. The total workpieces thickness of a riveted joint is known as the "grip", and the range of total thicknesses over which a particular design of rivet will operate successfully is known as its "grip range". Thus the grip range should be as wide as possible.

Another feature of such rivets which is also important is the ability of the rivet to effectively fasten together workpieces which initially have a gap between them, and may provide resistance to closing the gap, by pulling the sheets together when the rivet is installed. This action is known as "clamp-up", and it is desirable in practice that a rivet should have good clamp-up.

Various designs and configurations of such breakstem blind rivets have been proposed. The present invention aims to provide a rivet which exhibits a wide grip-range and good clamp-up.

The invention provides, in one of its aspects, a blind break-stem rivet comprising a deformable tubular shell having a bore inside it and a stem extending along the bore and having a head adjacent one end of the shell; the exterior of the shell being formed with a plurality of circumferential zones of modified strength spaced apart along the shell; in which the spacing between each zone and the next progressively decreases as the distance along the shell from the said one end thereof increases.

By "spacing between each zone and the next" is meant the distance along the shell between the nearer edges of adjacent zones.

Preferably the spacing between that zone which is nearest the said one end of the shell, and the said one end of the shell, is less than the minimum spacing between any two adjacent zones.

Preferably the maximum spacing between any two adjacent zones is less than the external diameter of the tubular shell.

When the shell has an enlarged head at the end thereof remote from the said one end, preferably the spacing between the zone nearest the head of the shell, and the head of the shell, is not less than minimum spacing between any two adjacent zones.

Preferably the spacing between the zone nearest the head of the shell, and the head of the shell, is not greater than the maximum spacing between any two adjacent zones.

Preferably the zones of modified strength are each provided by a rolled circumferential groove having a width to depth ratio greater than 5.

Preferably there are three zones of modified strength spaced apart along the shell.

The zones of modified strength are stronger than the remainder of the shell preferably each zone is provided by a reduction in thickness of the shell wall. The reduction in thickness is the result of locally compressing the material of the shell, thereby work-hardening it. Preferably the local compression is produced by a rolling process.

Further features of the invention will be found in the following description and in the accompanying claims.

Figure 2:
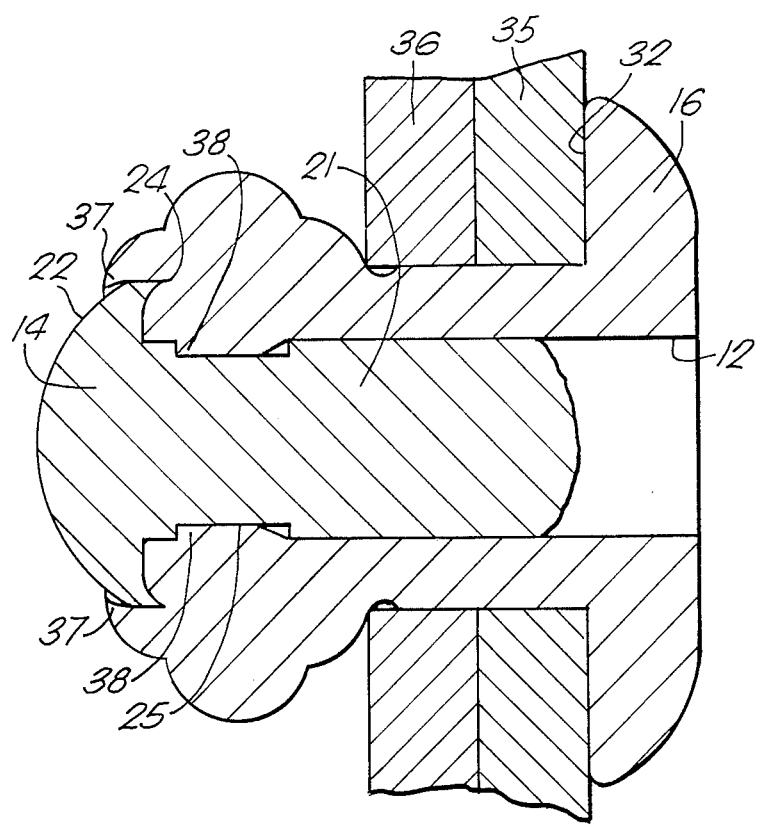

A specific embodiment of the invention will now be described by way of example and with reference to the accompanying drawings, in which:

FIG. 1 is an elevation of the shell and associated part of the stem of a blind break-stem rivet, certain concealed features being shown in broken lines; and FIG. 2 is an axial section through the rivet after having been placed.

The rivet comprises a deformable tubular shell 11 of aluminium alloy with 2% magnesium. The shell has a substantially uniform bore 12 extending throughout its length. Extending through the bore is a stem 13 of low-carbon steel, which is harder than the shell material, the stem 13 being a close fit within the bore 12. The stem 13 has an enlarged head 14 which is adjacent one end 15 (the tail end) of the shell. The other end of the shell is formed with an enlarged head 16, of snap-head configuration. Part 17 of the stem protrudes from the shell beyond the shell head 16, being shown broken-away in FIG. 1. In use of the rivet, this protruding part of the stem is gripped and pulled by the jaws of a placing tool, against a reaction taken up on the end face 18 of the shell head 16. This pull applies axial compression to the shell, causing it to contract axially and to buckle outwardly to form a blind head. The stem is formed with a weakened portion or breakneck 19 at which the stem eventually breaks, leaving the stem head 14 and the adjacent part 21 of the stem plugging the bore of the placed rivet.

Such blind break-stem rivets are, in general, well known.

In the rivet of this example, the stem-head 14 has a convexly domed end face 22, so that its diameter reduces axially behind the peripheral edge 24, after a short parallel portion 34. The underface 23 of the head, which surrounds the stem, is bounded by the peripheral edge 24. The face 23 is concavely dished, in such a way that it slopes progressively more steeply as it extends radially inwardly and axially behind the peripheral edge. Thus the slope of the face progressively increases from the radially outermost part 23a adjacent the edge 24 to the radially more inward part 23b. The peripheral edge 24 is fairly sharp and faces towards the end face 15 of the shell. The diameter of the peripheral edge 24 is slightly less than the outside diameter of the face 15. A locking portion 25 of the stem adjacent the head 14 and slightly spaced from it is of slightly reduced diameter, along an axial length of about half its diameter.

The shell 11 is of uniform external diameter, except for three zones of modified strength provided by circumferential grooves 27, 28 and 29, in order from nearest the shell tail end to nearest the shell head end.

The zones of modified strength are zones of increased strength, these zones having been produced by local compression of the material of the shell, thereby to work-harden it. The compression is conveniently and preferably produced by a rolling process. The effect of the zones of increased strength is to promote buckling of the shell under axial compression. The configuration of the buckling is affected by the positions of the zones along the shell.

In this example, each groove is arcuate in cross-section and all the grooves are identical in width, depth and curvature of cross-section respectively, as is illustrated in FIG. 1. The spacing, along the axial direction of the shell, between the head-most groove 29 and the intermediate groove 28, is less than the spacing between the intermediate groove 28 and the tail-most groove 27. The spacing between the head-most groove 29 and the underface 32 of the head 16 is intermediate in extent between the spacing between the intermediate groove 28 and the head-most groove 29, and the spacing between the tail-most groove 27 and the intermediate groove 28. The spacing between the tail-most groove 27 and the tail end 15 of the shell is substantially less than the minimum spacing between adjacent grooves, i.e. less than the spacing between the intermediate groove 28 and the head-most groove 29. The maximum spacing between adjacent grooves, i.e. between the head-most groove 27 and the intermediate groove 28, is less than the external diameter of the shell.

The shell is first manufactured without the grooves 27, 28 and 29. It is then assembled on the stem, preferably leaving a slight gap between the tail end face 15 of the shell and the adjacent peripheral edge 24 of the stem head, so that the shell does not suffer any substantial axial compression force during assembly. The grooves 27, 28 and 29 are then rolled into the exterior of the shell with a width to depth ratio greater than 5, preferably 5.6. The consequent three local minor deformations of the wall of the shell bore 12 assist in retaining the shell 11 assembled on the stem 13. In the assembled position illustrated in FIG. 1, the breakneck 19 is positioned somewhat to the tail-ward side of the intermediate groove 28.

In use of the rivet, the shell is inserted through a hole in a workpiece (e.g. two or more sheets to be riveted together, such as 35, 36 in FIG. 2), the hole being of suitable diameter slightly larger than the external diameter of the shell, until the underface 32 of the shell head contacts the near face of the workpiece. A suitable rivet-placing tool is then applied to the rivet, to pull the stem with respect to the shell head. The stem head closes up to the shell tail end face 15 and applies axial compression to the shell. The shell buckles outwardly, the buckling starting at the next groove outside the blind face of the workpiece. Outward buckling of the tail-most part 33 of the shell, beyond the groove 27, is restrained, at least initially, by the engagement of the peripheral edge 24 of the stem head with the end face 15 of the shell.

The outward buckling of the shell forms a blind head which engages the blind face of the workpiece and pulls the sheets together (if there is a gap between them) and into tight contact. Continued pulling on the stem causes the part of the shell inside the workpiece to expand radially outwardly, thus filling the hole. As the pulling force increases further, the stem head 14 then enters the tail-most part of the shell. The sharp edge 24 of the stem head 14, which is of less diameter than the periphery of the tail end face 15 of the shell, cuts into the tail end face of the shell, so that material from the annular radially outermost part thereof flows around the edge of the stem head, past the parallel portion 34, and contracts over the outer edge of the domed face 22, as illustrated at 37 in FIG. 2. The progressively sloping face 23 progressively deforms material from the shell radially inwardly to engage the locking portion 25 of the stem, as illustrated at 38 in FIG. 2. The stem head 14 and the adjacent part 21 of the stem are thereby locked into the tail-most end part of the shell. As the tension on the rivet stem increases still further, the stem 13 breaks at the breakneck 19, leaving the rivet fully placed, as illustrated in FIG. 2.

It is found that the rivet of this example can be used to secure together sheets having a total thickness (or "grip") which may lie between limits defined by the distance between the shell head underface 32 and (a) approximately half the spacing between the shell head underface 32 and the head-most groove 29, as a minimum, and (b) somewhat on the shell-tail side of the intermediate groove 28 and approximately level with the stem breakneck 19, as a maximum. Thus the example rivet has a "grip range" covering a ratio of about 6 to 1.

The dimensions of the rivet of this example are as follows:

| Dimension | Inches | Millimetres |
|---|---|---|
| Stem head 14 outside diameter | 0.120 ins | 3.05 mm |
| Gap - maximum | 0.015 ins | 0.38 mm |
| Shell 11 outside diameter | 0.122 ins | 3.1 mm |
| Grooves 27/28/29 - | | |
| width at shell surface | 0.028 ins | 0.71 mm |
| Maximum depth | 0.005 ins | 0.127 mm |
| Spacing - | | |
| tail end face 15 to groove 27 | 0.036 ins | 0.91 mm |
| groove 27 to groove 28 | 0.072 ins | 1.82 mm |
| groove 28 to groove 29 | 0.052 ins | 1.32 mm |
| groove 29 to head face 32 | 0.067 ins | 1.70 mm |
| Total - | | |
| tail face 15 to head face 32 | 0.311 ins | 7.9 mm |
| Minimum grip | 0.032 ins | 0.81 mm |
| Maximum grip | 0.187 ins | 4.75 mm |

It is found that the particular combination of groove spacings of the rivet of the foregoing example gives good "clamp-up" in use of the rivet; that is to say, the rivet is particularly good at closing together sheets which are initially separated by a gap, and which may provide resistance to closing that gap.

It is also found that the configuration of the stem head in the foregoing example gives good locking of the stem into the shell.

The invention is not restricted to the details of the foregoing example. For instance, the rivet may have more than three grooves, provided that the spacing between each groove and the next progressively decreases as the distance along the shell from the tail end increases. The grooves may be rolled into the shell before assembly with the stem.

The zones of modified strength along the shell may be zones of reduced strength. These may be provided by zones of reduced thickness which are the result of removing material from the shell, for example by a turning process. These zones of reduced strength also promote radial buckling of the shell when it is axially compressed. The appearance of the rivet would be substantially identical with that shown in FIG. 1, although the configuration of the buckling may be slightly different from that shown in FIG. 2 which results from zones of increased strength.

The zones of modified strength may be provided by configurations other than the grooves described. Although it is convenient to form a continuous groove by a rolling or turning process, a circumferential groove or other form of zone of modified strength need not extend continuously around the shell but could be interrupted, provided that it is effective in causing the shell to buckle satisfactory when the rivet is placed as described above. The configuration of the stem and its head may be other than as described.

We claim:

1. A blind break-stem rivet comprising a deformable tubular shell having a bore inside it, and a stem extending along the bore and having a head adjacent one end of the shell;
   the shell being formed with a plurality of circumferential zones of modified strength spaced apart along the shell;
   in which the spacing between each zone and the next progressively decreases as the distance along the shell from the said one end thereof increases,
   wherein each of said zones of modified strength is a single rolled groove having a width to depth ratio greater than 5,
   whereby said rivet has a large grip range and good clamp-up.

2. A rivet as claimed in claim 1, in which the spacing between the zone which is nearest the said one end of the shell, and the said one end of the shell, is less than the minimum spacing between any two adjacent zones.

3. A rivet as claimed in claim 1, in which the maximum spacing between any two adjacent zones is less than the external diameter of the tubular shell.

4. A rivet as claimed in claim 1, in which the shell has an enlarged head at the end thereof remote from the said one end, and the spacing between the zone nearest the head of said shell, and the head of said shell, is not less than minimum spacing between any two adjacent zones.

5. A rivet as claimed in claim 1, in which the shell has an enlarged head at the end thereof remote from said one end, and in which the spacing between the zone nearest the head of the shell, and the head of the shell, is not greater than the maximum spacing between any two adjacent zones.

6. A rivet as claimed in claim 1, in which there are three zones of modified strength spaced apart along the shell.

7. A rivet as claimed in claim 1, in which the zones of modified strength are stronger than the remainder of the shell.

8. A rivet as claimed in claim 7, in which each zone is provided by a reduction in thickness of the shell wall.

9. A rivet as claimed in claim 7, in which end zone is provided by a reduction in thickness of the shell wall which is a result of rolling the material of the shell, thereby work-hardening it.

10. A rivet as claimed in claim 1 wherein said width to depth ratio is approximately 5.6.

* * * * *